United States Patent
Lee et al.

(10) Patent No.: US 8,923,430 B2
(45) Date of Patent: Dec. 30, 2014

(54) METHOD AND APPARATUS FOR ESTIMATING OFFSET VALUE, RECEIVING APPARATUS, AND METHOD OF PROCESSING SIGNAL IN RECEIVING APPARATUS

(71) Applicant: Samsung Electronics Co., Ltd., Suwon-si (KR)

(72) Inventors: Heun-chul Lee, Hwaseong-si (KR); Dong-wook Kim, Seoul (KR); Jong-jin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 13/797,107

(22) Filed: Mar. 12, 2013

(65) Prior Publication Data

US 2013/0243111 A1 Sep. 19, 2013

(30) Foreign Application Priority Data

Mar. 13, 2012 (KR) .................. 10-2012-0025665

(51) Int. Cl.
*H04B 15/00* (2006.01)
*H04L 25/02* (2006.01)
*H04L 7/04* (2006.01)

(52) U.S. Cl.
CPC .............. *H04L 25/022* (2013.01); *H04L 7/042* (2013.01); *H04L 25/0202* (2013.01)
USPC ........... 375/285; 375/260; 375/211; 375/296; 375/316; 375/341; 375/147

(58) Field of Classification Search
CPC .............. H04L 5/0023; H04L 27/2657; H04L 25/0202; H04L 25/0242; H04L 27/2647; H04L 25/0204; H04L 25/0212; H04L 27/2626; H04L 27/2649; H04L 27/2692; H04L 5/0007; H04L 25/0256; H04L 2027/0026
USPC ................ 375/285, 147, 211, 260, 296, 316; 370/208, 235, 329, 476
See application file for complete search history.

(56) References Cited

U.S. PATENT DOCUMENTS

| 8,248,975 | B2 * | 8/2012 | Fujita et al. | 370/310 |
| 8,301,208 | B2 * | 10/2012 | Katsube et al. | 455/574 |

(Continued)

FOREIGN PATENT DOCUMENTS

| KR | 10-0640472 B1 | 10/2006 |
| KR | 10-0758873 B1 | 9/2007 |

(Continued)

OTHER PUBLICATIONS

J. Massey, "Optimum Frame Synchronization," *IEEE Transactions on Communications*, vol. COM-20, No. 2, Apr. 1972, pp. 115-119.

(Continued)

*Primary Examiner* — Dhaval Patel
(74) *Attorney, Agent, or Firm* — NSIP Law

(57) ABSTRACT

A receiving apparatus for receiving a signal from a transmitting includes a receiving unit configured to receive the signal from the transmitting apparatus; a selecting unit configured to select whether to consider channel information in estimating an offset value between the transmitting apparatus and the receiving apparatus; an offset value estimating apparatus configured to estimate the offset value between the transmitting apparatus and the receiving apparatus either considering the channel information or without considering the channel information based on a selection made by the selecting unit; a synchronization performing unit configured to perform synchronization based on the estimated offset value; and a demodulation unit configured to perform demodulation of the received signal based on a result of performing the synchronization.

20 Claims, 7 Drawing Sheets

(56) References Cited

U.S. PATENT DOCUMENTS

| | | | |
|---|---|---|---|
| 8,718,206 B2* | 5/2014 | Maruta | 375/344 |
| 2007/0211835 A1* | 9/2007 | Inagawa et al. | 375/343 |
| 2011/0150044 A1 | 6/2011 | Rousseaux et al. | |

FOREIGN PATENT DOCUMENTS

| | | |
|---|---|---|
| KR | 10-0807719 B1 | 2/2008 |
| KR | 10-0998415 B1 | 12/2010 |

OTHER PUBLICATIONS

R. Scholtz, "Frame Synchronization Techniques," *IEEE Transactions on Communications,* vol. COM-28, No. 8, Apr. 1980, pp. 1204-1213.

G. Lui et al., "Frame Synchronization for Gaussian Channels," *IEEE Transactions on Communications,* vol. COM-35, No. 8, Aug. 1987, pp. 818-829.

P. Robertson, "Maximum Likelihood Frame Synchronization for Flat Fading Channels," *SUPERCOMM/ICC '92: Discovering a New World of Communications, Conference Record of the IEEE International Conference on Communications, 1992 (ICC '92),* vol. 3, pp. 1426-1430, conference held Jun. 14-18, 1992, Chicago.

A. Kopansky et al., "Frame Synchronization for Noncoherent Demodulation on Flat Fading Channels," *Conference Record of the 2000 IEEE International Conference on Communications (ICC 2000),* vol. 1, pp. 312-316, conference held Jun. 18-22, 2000, New Orleans, paper presented on Jun. 19, 2000.

"Part 15.4: Wireless Medium Access Control (MAC) and Physical Layer (PHY) Specifications For Low-Rate Wireless Personal Area Networks (WPANs)," *IEEE Standard 802.15.4-2006,* 2006, pp. 1-26.

M. Chiani et al., "Optimum Synchronization of Ternary Preamble Sequences in Gaussian Noise," *Proceedings of the IEEE 5th International Symposium on Wireless Pervasive Computing 2010 (IEEE ISWPC 2010),* pp. 146-150, conference held May 5-7, 2010, Modena, Italy.

* cited by examiner

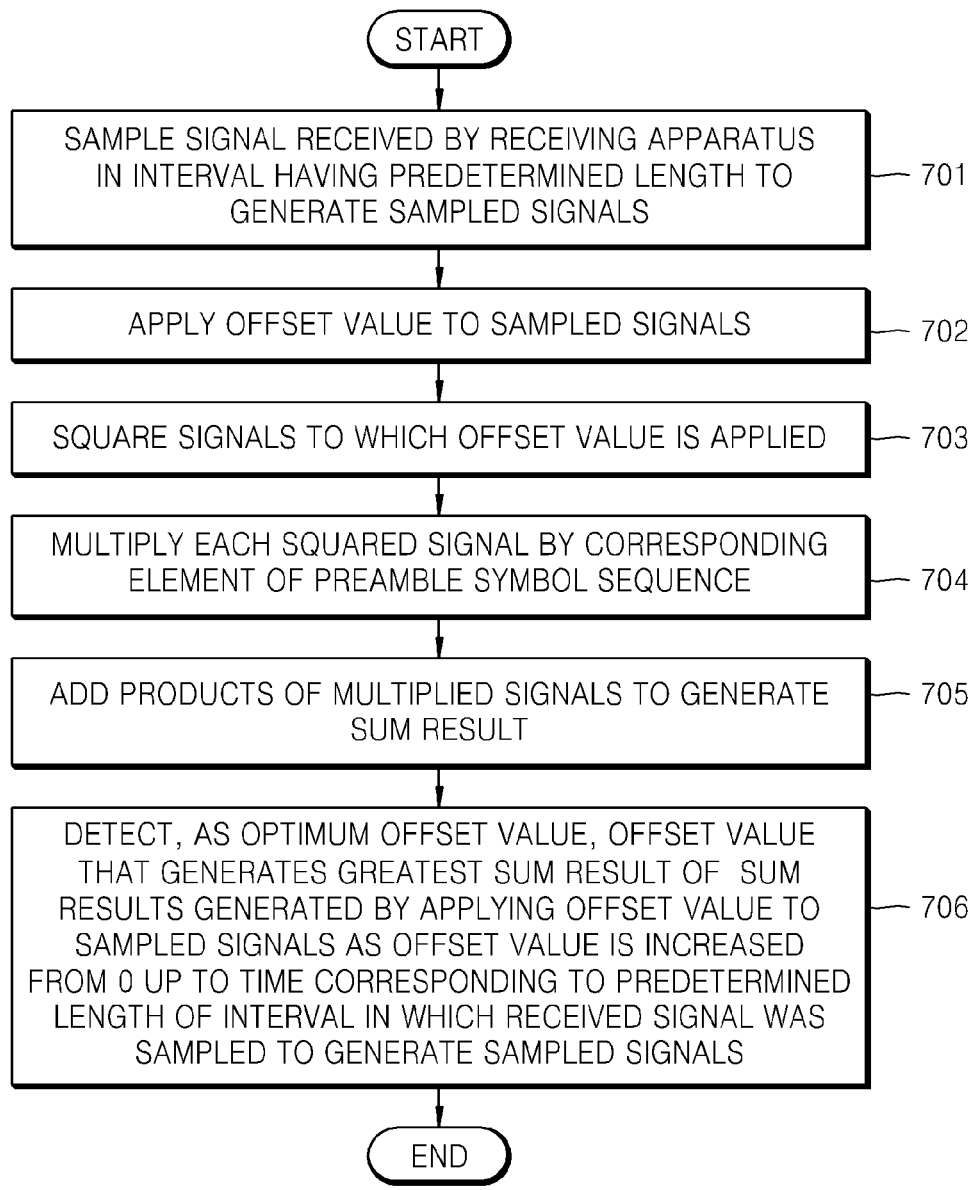

METHOD AND APPARATUS FOR ESTIMATING OFFSET VALUE, RECEIVING APPARATUS, AND METHOD OF PROCESSING SIGNAL IN RECEIVING APPARATUS

CROSS-REFERENCE TO RELATED APPLICATIONS

This application claims the benefit of Korean Patent Application No. 10-2012-0025665 filed on Mar. 13, 2012, in the Korean Intellectual Property Office, the disclosure of which is incorporated herein by reference in its entirety for all purposes.

BACKGROUND

1. Field

This application relates to methods and apparatuses for estimating an offset value, receiving apparatuses, and methods of processing a signal in receiving apparatuses.

2. Description of Related Art

In order to perform communication between a transmitting apparatus and a receiving apparatus, the receiving apparatus needs to be synchronized with the transmitting apparatus. The receiving apparatus may use a predetermined sequence that is shared by the transmitting apparatus and the receiving apparatus in order to perform the synchronization of the receiving apparatus with the transmitting apparatus.

SUMMARY

In one general aspect, a receiving apparatus for receiving a signal from a transmitting apparatus includes a receiving unit configured to receive the signal from the transmitting apparatus; a selecting unit configured to select whether to consider channel information in estimating an offset value between the transmitting apparatus and the receiving apparatus; an offset value estimating apparatus configured to estimate the offset value between the transmitting apparatus and the receiving apparatus either considering the channel information or without considering the channel information based on a selection made by the selecting unit; a synchronization performing unit configured to perform synchronization based on the estimated offset value; and a demodulation unit configured to perform demodulation of the received signal based on a result of performing the synchronization.

The synchronization performing unit may be further configured to generate a feedback signal for selecting whether the channel information is to be considered in estimating the offset value based on the result of performing the synchronization, or the demodulation unit may be further configured to generate a feedback signal for selecting whether the channel information is to be considered in estimating the offset value based on a result of performing the demodulation, or the synchronization performing unit may be further configured to generate a feedback signal for selecting whether the channel information is to be considered in estimating the offset value based on the result of performing the synchronization and the demodulation unit may be further configured to generate a feedback signal for selecting whether the channel information is to be considered in estimating the offset value based on a result of performing the demodulation; and the selecting unit may be further configured to select whether to consider the channel information in estimating the offset value based on the feedback signal generated by the synchronization performing unit, or the feedback signal generated by the demodulation unit, or based on the feedback signal generated by the synchronization demodulation unit and the feedback signal generated by the demodulation unit.

The offset value estimating value apparatus may include a first offset value estimating apparatus configured to estimate the offset value by performing a calculation according to the following equation:

$$\mu_1 = \arg\max_{0 \le \mu \le LT-1} \sum_{i=0}^{T-1} |y^\mu_{Li+\mu}|^2 |c_i|$$

where $\mu_1$ denotes an optimum offset value, $y^\mu$ denotes a signal to which the offset value is applied, c denotes a ternary sequence including three types of elements, L denotes a length of a predetermined interval at which the elements of the ternary sequence are arranged to form a preamble symbol sequence included in each of a plurality of preamble symbols included in a preamble of the received signal, T denotes a total number of the elements of the ternary sequence, and $\mu$ denotes an offset value applied to the sampled signal to obtain the signal $y^\mu$.

The receiving apparatus may further include a channel information estimating unit configured to estimate the channel information in real time based on either one or both of the result of performing the synchronization and a result of performing the demodulation; and a channel information storage unit configured to store the channel information that is estimated in real time and pre-stored channel information.

The offset value estimating apparatus may further include a second offset estimating apparatus configured to estimate the offset value based on amplitude information of the estimated channel information or the pre-stored channel information; and a third offset estimating apparatus configured to estimate the offset value based on amplitude information and phase information of the estimated channel information or the pre-stored channel information.

The second offset value estimating apparatus may be further configured to estimate the offset value by performing a calculation according to the following equation:

$$\mu_2 = \arg\max_{0 \le \mu \le LT-1} \sum_{i=0}^{T-1} 2|y^\mu_{Li+\mu} c_i||h^\mu_{Li+\mu}| - |h^\mu_{Li+\mu}|^2 c_i^2$$

where $\mu_2$ denotes an estimated offset value, $y^\mu$ denotes a signal to which the offset value is applied, c denotes a ternary sequence including three types of elements, $h^\mu$ denotes channel information to which the offset value is applied, L denotes a length of a predetermined interval at which the elements of the ternary sequence are arranged to form a preamble symbol sequence included in each of a plurality of preamble symbols included in a preamble of the received signal, T denotes a total number of the elements of the ternary sequence, and $\mu$ denotes an offset value applied to the sampled signal to obtain the signal $y^\mu$.

The third offset value estimating apparatus may be further configured to estimate an offset value by performing a calculation according to the following equation:

$$\mu_3 = \arg\max_{0 \le \mu \le LT-1} \sum_{i=0}^{T-1} 2\operatorname{Re}[(y^\mu_{Li+\mu})^* h^\mu_{Li+\mu}] c_i - |h^\mu_{Li+\mu}|^2 c_i^2$$

where $\mu_3$ denotes an estimated offset value, $y^\mu$ denotes a signal to which the offset value is applied, c denotes a ternary sequence including three types of elements, $h^\mu$ denotes channel information to which the offset value is applied, L denotes a length of a predetermined interval at which the elements of the ternary sequence are arranged to form a preamble symbol sequence included in each of a plurality of preamble symbols included in a preamble of the received signal, T denotes a total number of the number of the elements of the ternary sequence, and μ denotes an offset value applied to the sampled signal to obtain the signal $y^μ$.

In another general aspect, an apparatus for estimating an optimum offset value with respect to a transmitting apparatus includes a sampler configured to sample a signal received from the transmitting apparatus in an interval having a predetermined length to generate sampled signals; an offset value applying unit configured to apply an offset value to the sampled signals to obtain signals to which the offset value is applied; a squaring unit configured to square each signal to which the offset value is applied; a multiplying unit configured to multiply each squared signal by a corresponding element of a preamble symbol sequence included in each of a plurality of preamble symbols included in a preamble of the received signal; an adding unit configured to add products of the signals multiplied by the multiplying unit to generate a sum result; and a detecting unit configured to detect, as the optimum offset value, an offset value that generates a greatest sum result of sum results generated by applying the offset value to the sampled signals as the offset value is increased from 0 up to a time corresponding to the predetermined length of the interval in which the received signal was sampled to generate the sampled signals; wherein the predetermined length of the interval in which the received signal is sampled to generate the sampled signals is equal to a length of each of the plurality of preamble symbols; and the preamble symbol sequence included in each of the preamble symbols is a same preamble symbol sequence in each of the preamble symbols.

The offset value applying unit may be further configured to rearrange the sampled signals based on a sampling order of the sampled signals by applying the offset value to the sampled signals.

The preamble symbol sequence may be configured so that three types of elements are arranged at the predetermined interval, and zeros are added between the elements.

The multiplying unit may be further configured to multiply an (Li+μ+1)th signal of the squared signals by an (i+1)th element of the elements of the preamble symbol sequence, where i denotes an integer equal to or greater than 0, L denotes a length of the predetermined interval at which the elements of the preamble symbol sequence are arranged, and μ denotes the offset value.

In another general aspect, a method for use in a receiving apparatus to estimate an optimum offset value with respect to a transmitting apparatus includes sampling a signal received by the receiving apparatus in an interval having a predetermined length to generate sampled signals; applying an offset value to the sampled signals to obtain signals to which the offset value is applied; squaring each signal to which the offset value is applied; multiplying each squared signal by a corresponding element of a preamble symbol sequence included in each of a plurality of preamble symbols included in a preamble of the received signal; adding products of the signals multiplied in the multiplying to generate a sum result; and detecting, as the optimum offset value, an offset value that generates a greatest sum result of sum results generated by applying the offset value to the sampled signals as the offset value is increased from 0 up to a time corresponding to the predetermined length of the interval in which the received signal was sampled to generate the sampled signals; wherein the predetermined length of the interval in which the received signal is sampled to generate the sampled signals is equal to a length of each of the plurality of preamble symbols; and the preamble symbol sequence included in each of the preamble symbols is a same preamble symbol sequence in each of the preamble symbols.

The applying of the offset value may include rearranging the sampled signals based on a sampling order of the sampled signals by applying the offset value to the sampled signals.

The preamble symbol sequence may be configured so that three types of elements are arranged at the predetermined interval, and zeros are added between the elements.

The multiplying may include multiplying an (Li+μ+1)th signal of the squared signals by an (i+1)th element of the elements of the preamble symbol sequence, where i denotes an integer equal to or greater than 0, L denotes a length of the predetermined interval at which the elements of the preamble symbol sequence are arranged, and μ denotes the offset value.

In another general aspect, a non-transitory computer-readable storage medium stores a program for controlling a computer to perform the method described above.

In another general aspect, a method for use in a receiving apparatus to process a signal includes receiving a signal from the transmitting apparatus; selecting whether to consider channel information in estimating an offset value between the transmitting apparatus and the receiving apparatus; estimating the offset value between the transmitting apparatus and the receiving apparatus either considering the channel information or without considering the channel information based on a selection made in the selecting; performing synchronization based on the estimated offset value; and performing demodulation of the received signal based on a result of performing the synchronization.

The method may further include generating a feedback signal for selecting whether the channel information is to be considered in estimating the offset value based on the result of performing the synchronization or generating a feedback signal for selecting whether the channel information is to be considered in estimating the offset value based on a result of performing the demodulation, or generating a feedback signal for selecting whether the channel information is to be considered in estimating the offset value based on the result of performing the synchronization and generating a feedback signal for selecting whether the channel information is to be considered in estimating the offset value based on a result of performing the demodulation; wherein the selecting may include selecting whether to consider the channel information in estimating the offset value based on the feedback signal generated based on the result of performing the synchronization, or based on the feedback signal generated based on a result of performing the demodulation, or based on the feedback signal generated based on the result of performing the synchronization and the feedback signal generated based on a result of performing the demodulation.

The method may further include estimating the channel information in real time based on either one or both of the result of performing the synchronization and a result of performing the demodulation; wherein the estimating of the offset value may include estimating the offset value considering the estimated channel information.

The estimating of the offset value considering the channel information may include estimating the offset value considering either amplitude information of the estimated channel information or amplitude information and phase information of the estimated channel information.

Other features and aspects will be apparent from the following detailed description, the drawings, and the claims.

BRIEF DESCRIPTION OF THE DRAWINGS

FIG. 7 is a flowchart illustrating an example of a method of estimating an optimum offset value.

DETAILED DESCRIPTION

Figure 1:
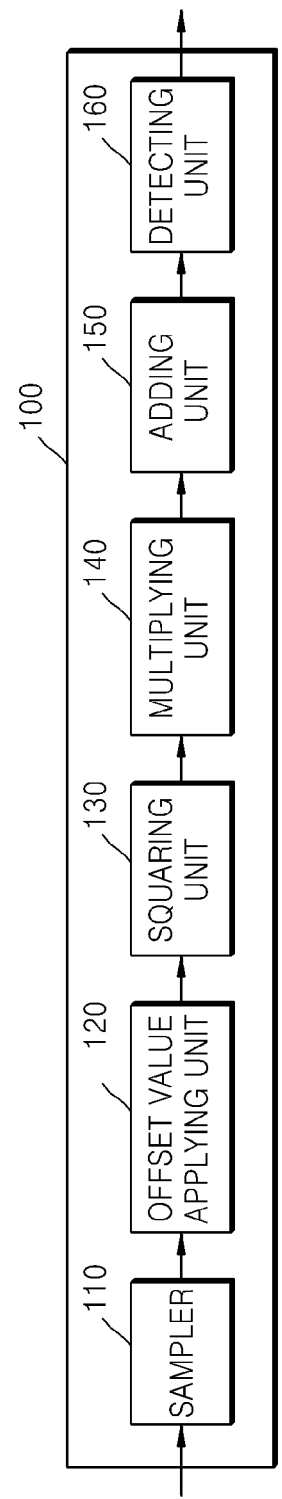
FIG. 1 is a block diagram illustrating an example of a first offset value estimating apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a block diagram illustrating an example of a first offset value estimating apparatus 100. Referring to FIG. 1, the first offset value estimating apparatus 100 includes a sampler 110, an offset value applying unit 120, a squaring unit 130, a multiplying unit 140, an adding unit 150, and a detecting unit 160.

FIG. 1 illustrates only elements of the first offset value estimating apparatus 100 relevant to this example. However, it will be apparent to one of ordinary skill in the art that the first offset value estimating apparatus 100 may include additional general-purpose elements.

The first offset value estimating apparatus 100 of FIG. 1 may be implemented by one or more processors. A processor may be implemented as an array of a plurality of logic gates, or may be implemented by combining a general-purpose microprocessor and a memory for storing a program to be executed by the microprocessor. It will be apparent to one of ordinary skill in the art that the processor may be implemented in hardware form.

The first offset value estimating apparatus 100 is an apparatus for estimating an optimum offset value between a transmitting apparatus and a receiving apparatus, and may be included in the receiving apparatus. The transmitting apparatus and the receiving apparatus may be any apparatus for transmitting and receiving data via a network. For example, the transmitting apparatus and the receiving apparatus may be an apparatus for transmitting and receiving data using a communication method such as an ultra-wideband (UWB) network, an impulse-radio UWB (IR-UWB) network, or a wireless personal area network (WPAN), but are not limited thereto. In addition, communication between the transmitting apparatus and the receiving apparatus may be performed using a method described in the IEEE 802.15.4a standard or the IEEE 802.15.6 standard, but is not limited to such a method.

The receiving apparatus performs frame synchronization using an offset value between the transmitting apparatus and the receiving apparatus when receiving a signal from the transmitting apparatus. The offset value between the transmitting apparatus and the receiving apparatus is a value for estimating a starting position of a frame of a signal that is received by the receiving apparatus. As the receiving apparatus estimates the starting position of the frame, synchronization between the transmitting apparatus and the receiving apparatus may be performed. Accordingly, an offset value may include a timing offset value.

The sampler 110 samples a signal received from the transmitting apparatus in an interval having a predetermined length to generate sampled signals. In this example, the predetermined length is the same as a length of each of a plurality of preamble symbols included in a preamble of the received signal. In addition, each of the plurality of preamble symbols includes the same preamble symbol sequence. The structure of a preamble of the received signal will be described in detail below with reference to FIG. 2.

The offset value applying unit 120 applies the offset value to the sampled signals generated by the sampler 110. For example, the offset value applying unit 120 rearranges a plurality of sampled signals based on a sampling order by applying the offset value. For example, the offset value applying unit 120 performs a calculation according to Equation 1 below.

$$y_i^\mu = \begin{cases} r_{i+\mu} & \text{where } 0 \leq i \leq N - \mu - 1 \\ r_{i+\mu-N} & \text{where } N - \mu \leq i \leq N - 1 \end{cases} \quad (1)$$

In Equation 1, r denotes a sampled signal, $y^\mu$ denotes a signal to which an offset value is applied, i denotes an index of the sampled signal and an index of the signal to which an offset value is applied, N denotes a predetermined length of an interval in which the received signal was sampled to generate the sampled signals, and µ denotes an offset value that is an integer that is equal to or greater than 0 and equal to or less than (N−1).

In greater detail, when $0 \leq i \leq N-\mu-1$, the offset value applying unit 120 defines an (i+p+1)th signal of the sampled signals as an (i+1)th signal of the signals to which the offset value is applied. When $N-\mu \leq i \leq N-1$, the offset value applying unit 120 defines an (i+µ−N+1)th signal of the sampled signals as an (i+1)th signal of signals to which the offset value is applied.

Thus, the offset value applying unit 120 applies the offset value to the sampled signals generated by the sampler 110 and arranges a plurality of sampled signals based on a sampling order in an order in which the offset value is applied. A case where the offset value applying unit 120 applies the offset value will be described in detail below with reference to FIG. 3.

The squaring unit 130 squares the signals to which the offset value is applied by the offset value applying unit 120. In this example, the squaring unit 130 squares absolute values of the signals to which the offset value is applied.

The multiplying unit 140 multiplies each squared signal by a corresponding element of a preamble symbol sequence included in each of a plurality of preamble symbols included in a preamble of a received signal. In this example, the multiplying unit 140 multiplies the squared signal by an absolute value of the corresponding element.

The first offset value estimating apparatus 100 is included in the receiving apparatus, and the receiving apparatus recognizes information regarding a preamble symbol sequence included in a preamble of the received signal. That is, the transmitting apparatus and the receiving apparatus share information regarding a predetermined preamble symbol sequence, and the transmitting apparatus transmits a signal generated using the predetermined preamble symbol sequence to the receiving apparatus.

Thus, in order to estimate the offset value, the multiplying unit 140 multiplies the squared signals by corresponding elements of the preamble symbol sequence.

In greater detail, the preamble symbol sequence included in the preamble symbol of the received signal is configured so that three types of elements are arranged at a predetermined interval, and zeroes are added between the elements. The structure of a preamble of the received signal will be described in detail below with reference to FIG. 2.

Thus, the multiplying unit 140 multiplies an (Li+μ+1)th signal of the squared signals by an (i+1)th element of elements constituting the preamble symbol sequence, where 'L' denotes a length of a predetermined interval at which the three types of elements constituting the preamble symbol sequence are arranged, and 'μ' denotes an offset value applied by the offset value applying unit 120.

The adding unit 150 adds products of the signals multiplied by the multiplying unit 140 to generate a sum result.

For example, the squaring unit 130, the multiplying unit 140, and the adding unit 150 perform a calculation according to Equation 2 below.

$$Sum_1 = \sum_{i=0}^{T-1} |y_{Li+\mu}^{\mu}|^2 |c_i| \quad (2)$$

In Equation 2, $Sum_1$ denotes the sum result generated by the adding unit 150, $y^{\mu}$ denotes a signal to which the offset value μ is applied, and is obtained by applying the offset value μ to a sampled signal, c denotes an element of a ternary sequence, i denotes an index of the signal to which the offset value μ is applied and an index of the element of the ternary sequence, where i is an integer that is equal to or greater than 0 and equal to or less than (T−1), L denotes a length of a predetermined interval at which three types of elements of the ternary sequence are arranged to constitute a preamble symbol sequence, μ denotes the offset value that is equal to or greater than 0 and equal to or less than (N−1), N denotes a predetermined length of an interval in which the received signal was sampled to generate the sampled signals, and T is a total number of elements of the ternary sequence.

The ternary sequence is a sequence including three types of elements arranged to constitute the preamble symbol sequence. The ternary sequence will be described in greater detail below with reference to FIG. 2.

Calculations performed by the squaring unit 130, the multiplying unit 140, and the adding unit 150 will be described in greater detail below with reference to FIG. 4.

The detecting unit 160 detects, as an optimum offset value, an offset value that generates a greatest sum result of sum results generated by applying the offset value to the sampled signals as the offset value is increased in the offset value applying unit 120 from 0 up to a time corresponding to the predetermined length of the interval in which the sampler 110 sampled the received signal to generate the sampled signals.

In greater detail, the offset value applying unit 120 applies the offset value to each of the sampled signals as the offset value is increased from 0 up to a time corresponding to the predetermined length of the interval in which the sampler 110 sampled the received signal to generate the sampled signals to generate signals to which the offset value is applied. The squaring unit 130, the multiplying unit 140, and the adding unit 150 generate sum results based on the offset value applied to the sampled signals. The detecting unit 160 detects, as an optimum offset value, an offset value that generates the greatest sum result of a plurality of sum results generated based on the offset value applied to the sampled signals. For example, the detecting unit 160 may perform a calculation according to Equation 3 below.

$$\mu_1 = \arg\max_{0 \leq \mu \leq LT-1} \sum_{i=0}^{T-1} |y_{Li+\mu}^{\mu}|^2 |c_i| \quad (3)$$

In Equation 3, $\mu_1$ denotes an optimum offset value detected by the detecting unit 160, μ denotes an offset value applied by the offset value applying unit 120, L denotes a length of a predetermined interval at which three types of elements of a ternary sequence are arranged to constitute a preamble symbol sequence, and T denotes a total number of elements of the ternary sequence. In addition, $$\sum_{i=0}^{T-1} |y_{Li+\mu}^{\mu}|^2 |c_i|$$

is the same as '$Sum_1$' defined in Equation 2 above, and accordingly a detailed description thereof will not be repeated here.

Accordingly, by performing a calculation according to Equation 3 above, the detecting unit 160 detects an optimum offset value between the transmitting apparatus and the receiving apparatus.

The operations described above enable the first offset value estimating apparatus 100 to detect an optimum offset value using a maximum likelihood (ML) method when the ternary sequence has unit power.

Figure 2:
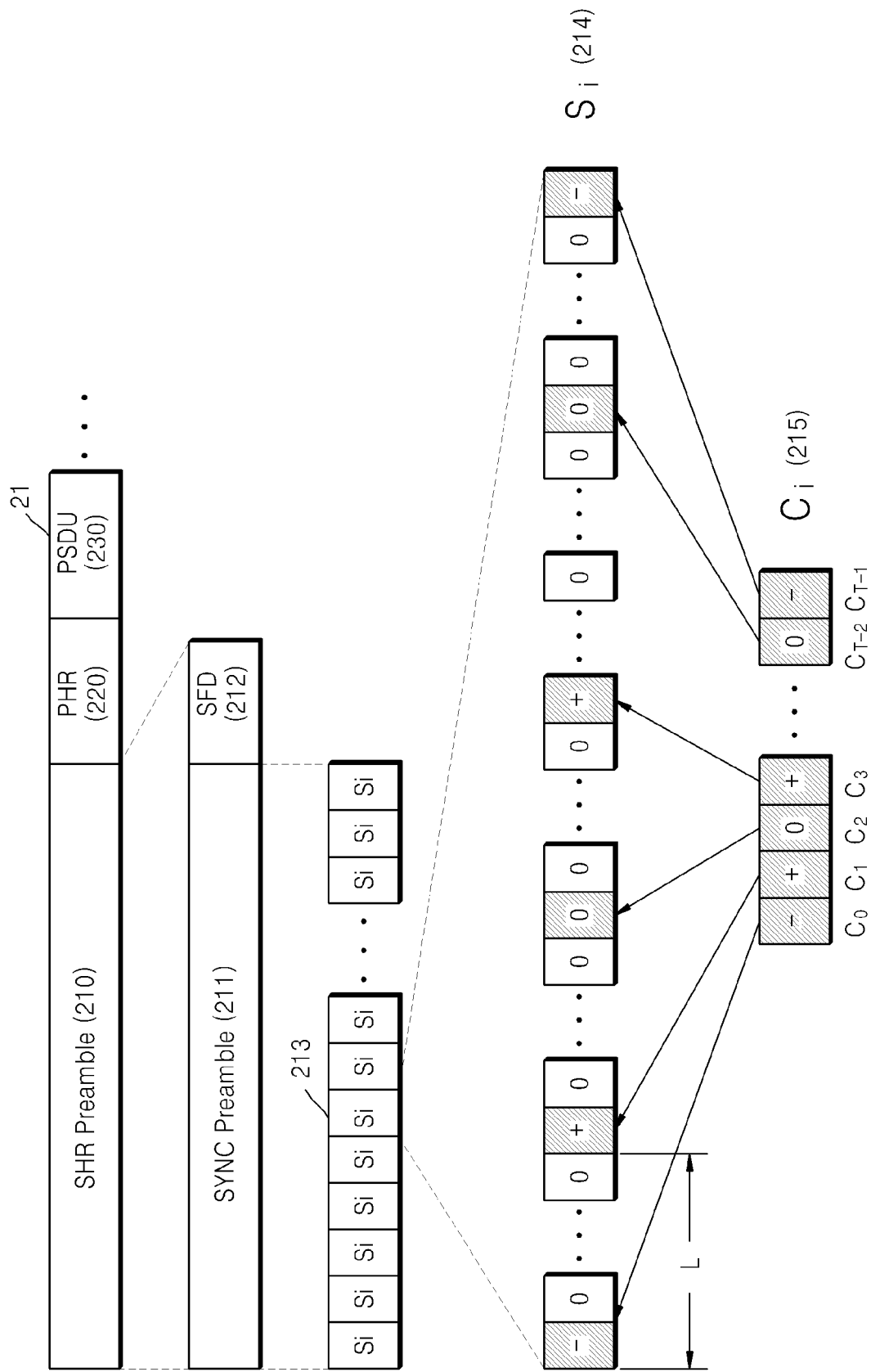
FIG. 2 is a diagram illustrating an example of the structure of a preamble of a received signal sampled by A sampler of FIG. 1.

FIG. 2 is a diagram illustrating an example of the structure of a preamble of a received signal sampled by the sampler 110 of FIG. 1. Referring to FIG. 2, each frame of the received signal includes a synchronization header (SHR) preamble 210, a physical layer header (PHR) 220, and a physical layer service data unit (PSDU) 230.

The SHR preamble 210 includes a synchronization (SYNC) preamble 211 and a start-of-frame delimiter (SFD) 212.

The SHR preamble 210 includes a plurality of preamble symbols. In this example, the preamble symbols are the same. That is, the SHR preamble 210 includes a plurality of preamble symbols 213 that are the same. Each of the preamble symbols 213 includes a plurality of preamble symbol sequences 214 that are the same. That is, the received signal includes repeated preamble symbols 213 as a prefix of a data frame.

Each preamble symbol sequence 214 includes a plurality of elements configured so that three types of elements are arranged at a predetermined interval, and zeros are added between the elements. The elements of the preamble symbol sequence 214 are elements of a ternary sequence 215 including the three types of elements. In greater detail, the ternary sequence 215 may be defined according to Equation 4 below.

$$C_i = [c_0 c_1 c_2 c_3 \ldots c_{T-1}] \quad (4)$$

In Equation 4, $c_i$ denotes the ternary sequence 215, and T denotes a length of the ternary sequence 215, that is, a total number of elements of the ternary sequence 215. For example, T denoting the length of the ternary sequence 215 may be 31 or 127, but is not limited thereto.

In greater detail, referring to FIG. 2, the ternary sequence 215 is a sequence including three types of elements {−1, 0, +1}. However, the ternary sequence 215 is not limited to these specific three types of elements.

The ternary sequence 215 is designed to have complete autocorrelation properties with a sequence that is the same as the ternary sequence 215, and to have minimum cross-correlation properties with a sequence that is different from the ternary sequence 215.

The preamble symbol sequences 214 are configured so that three types of elements are arranged at a predetermined interval, and zeros are added between the elements. L denotes a length of the predetermined interval at which the three types of elements are arranged, and may be 4, 16, or 64, but is not limited thereto. For example, if L is 4, then each element is followed by 3 zeros; if L is 16, then each element is followed by 15 zeros; and if L is 64, then each element is followed by 63 zeros.

That is, the preamble symbol sequence 214 may be obtained as a sequence of isolated pulses by spreading the ternary sequence 215 with a delta function K.

Referring to FIG. 2, for example, the preamble symbol sequence 214 is configured so that T elements −1, +1, 0, +1, through 0, −1 constituting the ternary sequence 215 are arranged at a predetermined interval having a length L, and zeros are added between the elements. Accordingly, the length of the preamble symbol sequence 214 is LT.

The structure of the preamble symbol sequence 214 of the signal received by the receiving apparatus described above allows duty cycling to be used in performing data communication between the transmitting apparatus and the receiving apparatus, thereby increasing energy efficiency.

The optimum offset value estimated by the first offset value estimating apparatus 100 may be used to perform symbol synchronization, which enables the SFD 212 in FIG. 2 to be detected to perform frame synchronization.

The structure of a preamble shown in FIG. 2 is the structure of a preamble according to IEEE 802.15.4a or IEEE 802.15.6. However, the structure of the preamble is not limited thereto.

Figure 3:
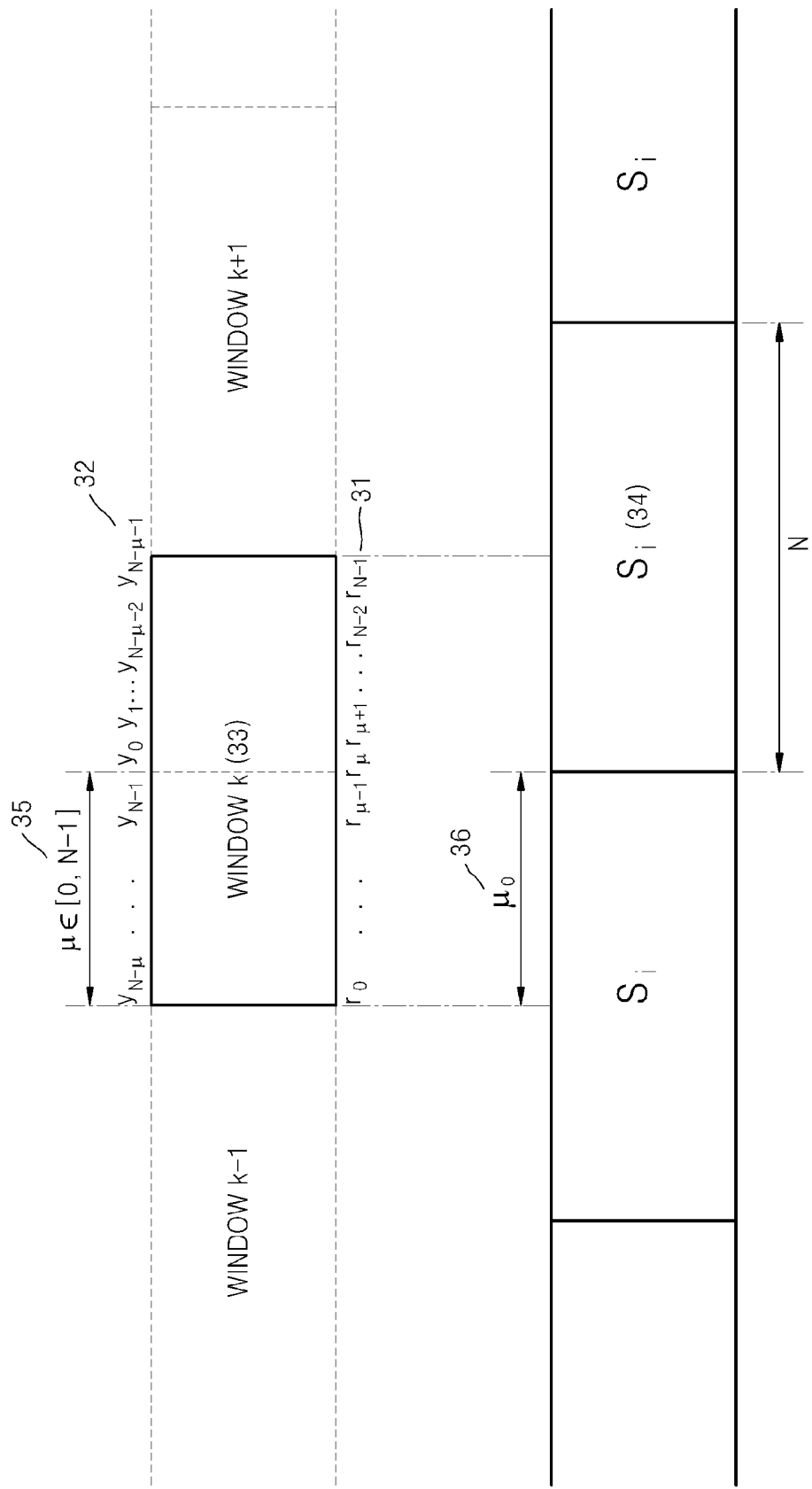
FIG. 3 is a diagram illustrating an example of a method of applying an offset value in an offset value applying unit of FIG. 1.

FIG. 3 is a diagram illustrating an example of a method of applying an offset value in the offset value applying unit 120 of FIG. 1. FIG. 3 shows sampled signals 31 that are sampled by the sampler 110 and signals 32 to which an offset value is applied by the offset value applying unit 120.

In greater detail, the sampler 110 samples the received signal using a sliding window 33 having a length N, which is equal to a length of a preamble symbol sequence 34.

The offset value applying unit 120 performs the calculation according to Equation 1 above on the sampled signals 31 to generate the signals 32 to which an offset value is applied. In greater detail, the sampled signals 31 may be defined according to Equation 5 below, and the signals 32 to which an offset value is applied that are generated by applying the offset value to the sampled signals 31 in the offset value applying unit 120 may be defined according to Equation 6 below.

$$r = [r_0 r_1 \ldots r_{\mu-1} r_\mu r_{\mu+1} \ldots r_{N-2} r_{N-1}] \quad (5)$$

$$y^\mu = [y_{N-\mu}{}^\mu y_{N-\mu+1}{}^\mu \ldots y_{N-1}{}^\mu y_0{}^\mu y_1{}^\mu \ldots y_{N-\mu-2}{}^\mu y_{N-\mu-1}{}^\mu] \quad (6)$$

In Equation 5, $r_0$ is a sampled signal, and in Equation 6, $y_{N-\mu}{}^\mu$ is a signal to which an offset value $\mu$ is applied that was obtained by applying the offset value $\mu$ to the sampled signal $r_0$ in the offset value applying unit 120. This means that a first signal of the sampled signals 31 corresponds to a (N−μ+1)th signal of the signals 32 to which an offset value is applied.

Also, in Equation 5, $r_{\mu-1}$ is a sampled signal, and in Equation 6, $y_{N-1}{}^\mu$ is a signal to which an offset value is applied that was obtained by applying the offset value $\mu$ to the sampled signal $r_{\mu-1}$ in the offset value applying unit 120. This means that a μth signal of the sampled signals 31 corresponds to an Nth signal of the signals 32 to which an offset value is applied.

In this manner, the offset value applying unit 120 applies offset values 35 to the sampled signals 31 to obtain the signals 32 to which an offset value is applied. The offset values 35 applied by the offset value applying unit 120 indicate possible starting positions of the preamble symbol sequence 34 in the sliding window 33, with each of the offset values 35 indicating a different possible starting position.

In addition, the offset value applying unit 120 applies an offset value to the sampled signals as the offset value 35 is increased from 0 up to a time corresponding to the length N of the sliding window 33. Thus, the detecting unit 160 may detect, as an optimum value, an offset value that satisfies Equation 7 below from offset values 35 that integers ranging from 0 and to (N−1).

$$\mu = \mu_0 \quad (7)$$

In Equation 7, $\mu$ denotes one of the offset values 35 and $\mu_0$ denotes an optimum offset value 36. As can be seen from FIG. 3, the optimum offset value 36 corresponds to a difference between a starting position of the sliding window 33 and a starting position of the preamble symbol sequence 34.

Thus, the first offset value estimating apparatus 100 estimates the optimum offset value 36 from the offset values 35 applied by the offset value applying unit 120.

Figure 4:
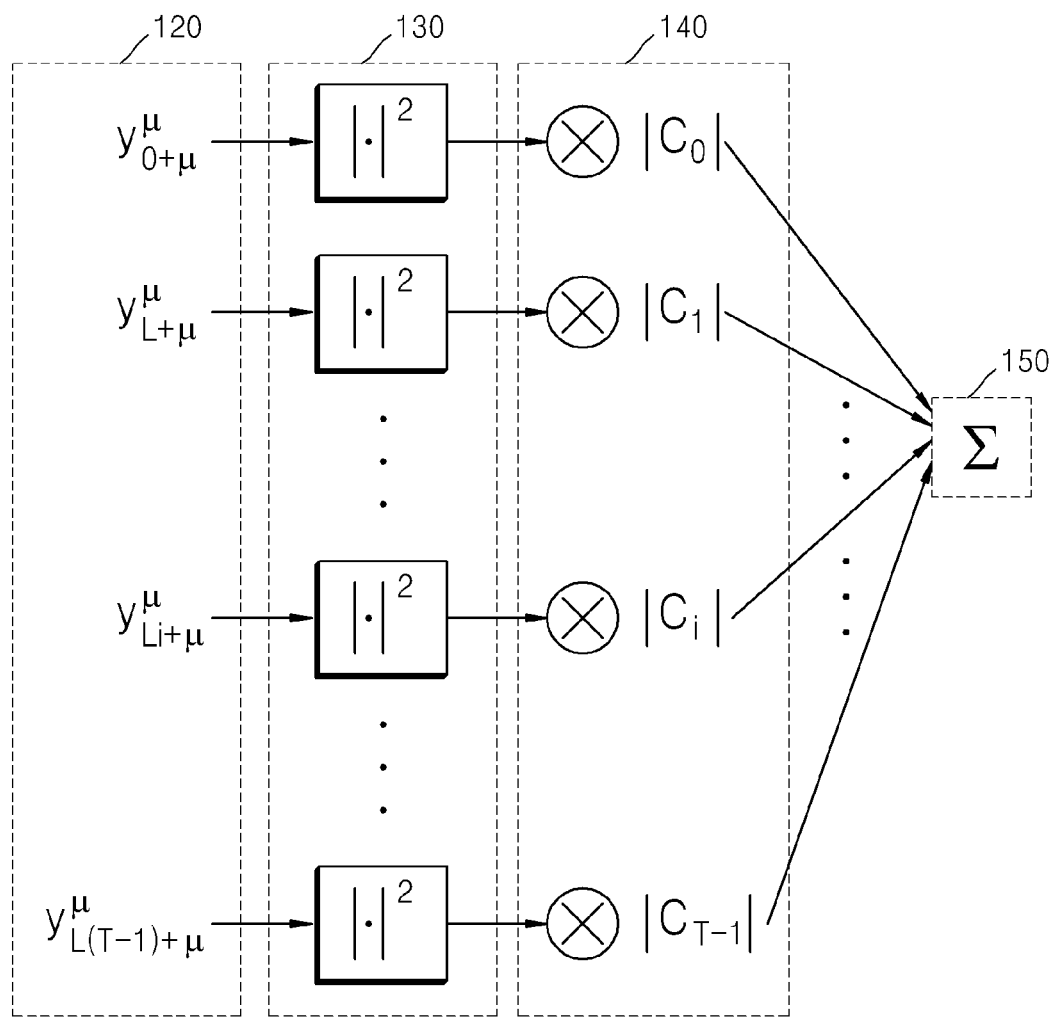
FIG. 4 is a diagram illustrating an example of a calculation performed by a squaring unit, a multiplying unit, and an adding unit of FIG. 1.

FIG. 4 is a diagram illustrating an example of a calculation performed by the squaring unit 130, the multiplying unit 140, and the adding unit 150 of FIG. 1. Referring to FIG. 4, each of the signals to which an offset value is applied that are output from the offset value applying unit 120 are squared by the squaring unit 130, the squared signals are multiplied by corresponding elements of the preamble symbol sequence by the multiplying unit 140, and products of the signals multiplied by the multiplying unit 140 are added by the adding unit 150 to generate a sum result.

The offset value μ is repeatedly increased by 1 from 0 up to (N−1), and the squaring, multiplication, and adding operations are repeated each time the offset value μ is increased by 1 to generate N sum results. The detecting unit 160 detects, as an optimum offset value, an offset value that generates the greatest sum result of the generated sum results. Depending on a user environment, the squaring operation may not be performed, and only the multiplication and adding operations may be performed.

Figure 5:
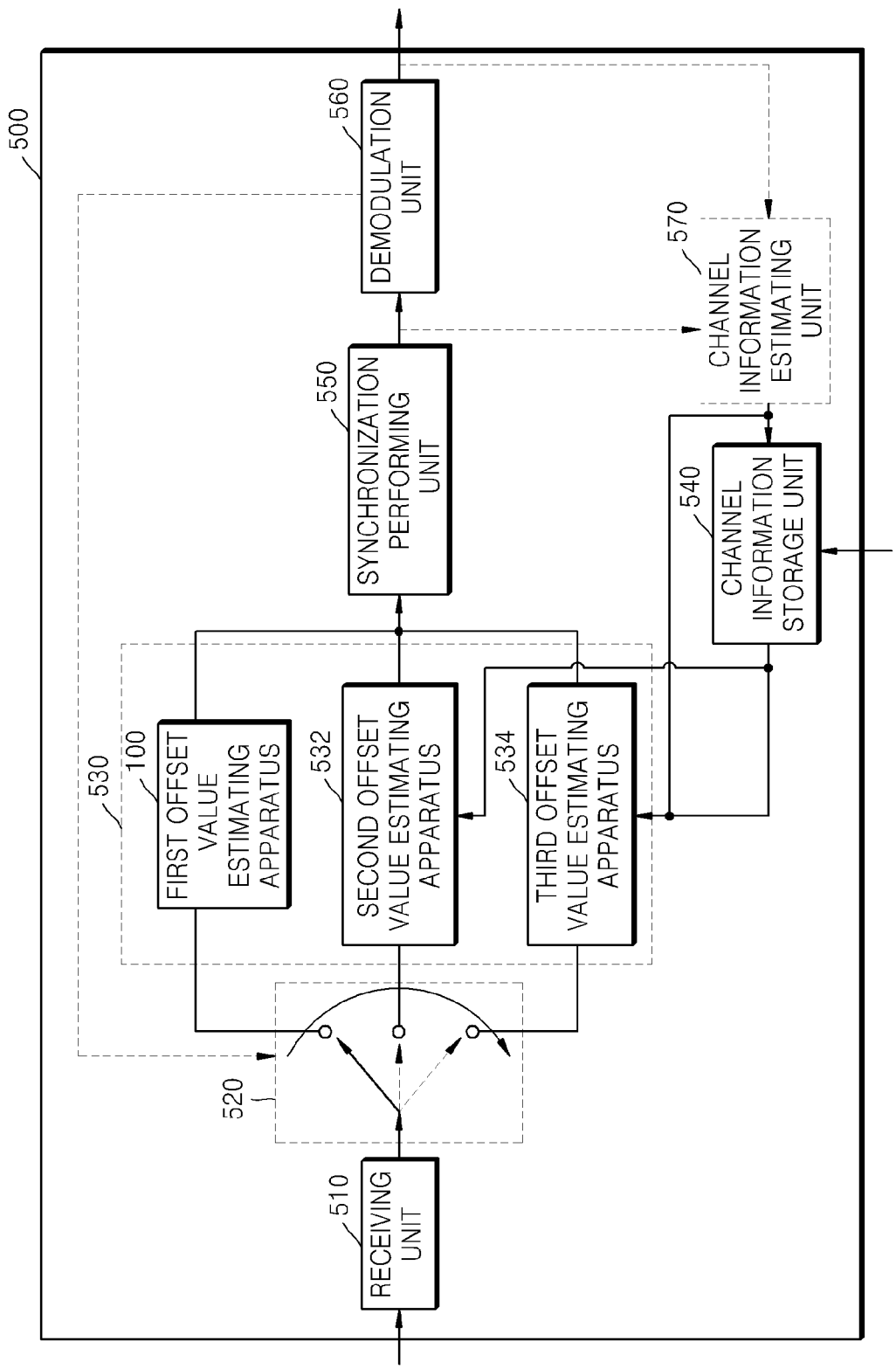
FIG. 5 is a block diagram illustrating an example of a receiving apparatus.

FIG. 5 is a block diagram illustrating an example of a receiving apparatus 500. Referring to FIG. 5, the receiving apparatus 500 includes a receiving unit 510, a selecting unit 520, an offset value estimating apparatus 530, a channel information storage unit 540, a synchronization performing unit 550, a demodulation unit 560, and a channel information estimating unit 570. The offset value estimating apparatus 530 includes the first offset value estimating apparatus 100 described above, a second offset value estimating apparatus 532, and a third offset value estimating apparatus 534.

The selecting unit 520, the offset value estimating apparatus 530, the synchronization performing unit 550, the demodulation unit 560, and the channel information estimating unit 570 may be implemented in processor form in a digital signal processor (DSP) of the receiving apparatus 500. However, these elements may also be implemented in other ways known to one of ordinary skill in the art, such as in hardware.

FIG. 5 illustrates only elements of the receiving apparatus 500 relevant to this example. However, it will be apparent to one of ordinary skill in the art that the receiving apparatus 500 may include additional general-purpose elements.

The first offset value estimating apparatus 100 of FIG. 1 is an example of the first offset value estimating apparatus 100 of FIG. 5. However, the first offset value estimating apparatus 100 of FIG. 5 is not limited to the specific example shown in FIG. 1. The detailed description of FIG. 1 is also applicable to the first offset value estimating apparatus 100 of FIG. 5, and will not be repeated here for conciseness.

The receiving apparatus 500 of FIG. 5 is a receiving apparatus including the first offset value estimating apparatus 100 of FIG. 1. Thus, the detailed description of FIGS. 1 through 4 are also applicable to the receiving apparatus 500 of FIG. 5, and will not be repeated here for conciseness. Thus, a signal received by the receiving apparatus 500 has a preamble having the structure shown in FIG. 2.

The receiving unit 510 receives a signal from a transmitting apparatus. For example, the receiving unit 510 may be a device for receiving a signal transmitted from a transmitting apparatus, such as an antenna.

The selecting unit 520 selects whether to consider channel information in estimating an offset value between the transmitting apparatus and the receiving apparatus 500.

For example, the selecting unit 520 selects whether to consider the channel information in estimating an offset value based on a signal fed back to the selecting unit 520 from the synchronization performing unit 550 or the demodulation unit 560. In this case, the synchronization performing unit 550 generates a feedback signal for selecting whether to consider the channel information in estimating an offset value based on a result of performing synchronization, or the demodulation unit 560 generates a feedback signal for selecting whether to consider the channel information in estimating an offset value based on a result of performing demodulation, or both the synchronization performing unit 550 and the demodulation unit 560 generate a feedback signal as described above. The feedback signal will be described in greater detail below in the description of the synchronization performing unit 550 and the demodulation unit 560.

The offset value estimating apparatus 530 estimates the offset value between the transmitting apparatus and the receiving apparatus 500 either considering the channel information or without considering the channel information based on a selection made by the selecting unit 520.

The first offset value estimating apparatus 100 estimates the offset value without considering the channel information. The second offset value estimating apparatus 532 and the third offset value estimating apparatus 534 consider the channel information in estimating the offset value.

In greater detail, the second offset value estimating apparatus 532 considers amplitude information of the channel information in estimating the offset value. The third offset value estimating apparatus 534 considers amplitude information and phase information of the channel information in estimating the offset value. The channel information may be estimated by the channel information estimating unit 570 in real time, or may be channel information that was previously stored in the channel information storage unit 540.

Channel information of a signal defined in Equation 6 above to which the offset value is applied will be described in greater detail below. An example of the channel information may be defined according to Equation 8 below.

$$y_i^\mu = h_i^\mu x_i^\mu + n_i^\mu \qquad (8)$$

In Equation 8, $y^\mu$ denotes an output signal of a channel to which an offset value $\mu$ is applied, $h^\mu$ denotes channel information to which the offset value $\mu$ is applied, $x^\mu$ denotes an input signal of the channel to which the offset value $\mu$ is applied, and $n^\mu$ denotes a noise signal to which the offset value $\mu$ is applied. A case where the receiving apparatus 500 performs frame synchronization will be described below. The input signal $x^\mu$ of the channel to which the offset value is applied may be a preamble symbol sequence, but is not limited thereto.

In addition, in Equation 8 above, the output signal $y^\mu$ of the channel to which the offset value is applied is a signal obtained by applying the offset value to a signal received by the receiving unit 510.

In this example, in Equation 8 above, $y^\mu$ is defined in a complex value form. Accordingly, $h^\mu$, $x^\mu$, and $n^\mu$ are also defined in complex value form.

An additive white Gaussian noise (AWGN) channel has channel information h=1. A Rayleigh fading channel has channel information h that is a Gaussian process with a zero mean and a unit variance. In addition, a noise signal n may have an independent identically distributed (i.i.d) complex Gaussian distribution. The second offset value estimating apparatus 532 and the third offset value estimating apparatus 534 estimate an offset value based on such channel information h.

Although block diagrams of the second offset value estimating apparatus 532 and the third offset value estimating apparatus 534 are not shown, the second offset value estimating apparatus 532 and the third offset value estimating apparatus 534 may have block diagrams similar to the block diagram of the first offset value estimating apparatus 100 of FIG. 1.

Thus, the detailed description of the sampler 110 and the offset value applying unit 120 of the first offset value estimating apparatus 100 of FIG. 1 are also applicable to the second offset value estimating apparatus 532 and the third offset value estimating apparatus 534. That is, the second offset value estimating apparatus 532 and the third offset value estimating apparatus 534 perform the same function as the first offset value estimating apparatus 100, except that the channel information is considered in estimating the offset value, and thus, a detailed description of the sampler 110 and the offset value applying unit 120 will not be repeated herein for conciseness.

The third offset value estimating apparatus 534 considers amplitude information and phase information of the channel information in estimating the offset value. For example, the third offset value estimating apparatus 534 may estimate the offset value by performing a calculation according to Equation 9 below.

$$\mu_3 = \arg \max_{0 \leq \mu \leq LT-1} \sum_{i=0}^{T-1} 2\operatorname{Re}[(y_{Li+\mu}^{\mu})^* h_{Li+\mu}^{\mu}]c_i - |h_{Li+\mu}^{\mu}|^2 c_i^2 \quad (9)$$

In Equation 9, $\mu_3$ denotes an optimum offset value estimated by the third offset value estimating apparatus 534, $y^\mu$ denotes a signal to which an offset value is applied, $h^\mu$ denotes channel information to which the offset value is applied, c denotes an element of a ternary sequence, Re[•] denotes a real number part of a complex value, (•)* denotes a complex conjugate of a complex value, μ denotes an offset value that is applied to a sampled signal to obtain $y^\mu$, and is an integer that is equal to or greater than 0 and equal to or less than (N−1), N denotes a predetermined length of an interval in which a received signal was sampled to generate sampled signals, L denotes a length of a predetermined interval at which three types of elements of the ternary sequence are arranged to constitute a preamble symbols sequence, and T denotes a total number of elements of the ternary sequence.

Equation 9 above may be obtained by applying a Bayesian maximum a posteriori probability (MAP) estimate in estimating an offset value from a signal to which the offset value is applied in order to estimate an optimum offset value.

The third offset value estimating apparatus 534 may estimate both an offset value of an AWGN channel and an offset value of a Rayleigh fading channel by applying the appropriate channel information h to Equation 9 above and performing the calculation according to Equation 9 above. By applying the channel information h=1 of the AWGN channel to Equation 9 above, the third offset value estimating apparatus 534 may estimate the offset value of the AWGN channel by performing a calculation according to Equation 10 below.

$$\mu_3 = \arg \max_{0 \leq \mu \leq LT-1} \sum_{i=0}^{T-1} y_{Li+\mu}^{\mu} c_i \quad (10)$$

The second offset value estimating apparatus 532 considers amplitude information of the channel information in estimating the offset value. In this case, a process by which the second offset value estimating apparatus 532 estimates the offset value considering amplitude information of the channel information includes a process of estimating the offset value using a probability average value of a phase parameter of the channel information.

For example, with regard to the channel information h, channel information in a Rayleigh fading channel has Rayleigh distribution properties. In this case, channel information h to which the offset value μ is applied may be defined according to Equation 11 below.

$$h_{Li+\mu}^{\mu} = a_{Li+\mu}^{\mu} \exp(j\theta_{Li+\mu}^{\mu}) \quad (11)$$

In Equation 11, h denotes channel information, 'a' denotes an amplitude of the channel information, and θ denotes a phase of the channel information. In this case, since the channel information h has Rayleigh distribution properties, the phase is uniformly distributed in a range of [−π, π] and has uniform i.i.d. properties.

For example, the second offset value estimating apparatus 532 may perform a calculation according to Equation 12 below to estimate channel information.

$$\mu_2 = \arg \max_{0 \leq \mu \leq LT-1} \sum_{i=0}^{T-1} 2|y_{Li+\mu}^{\mu} c_i||h_{Li+\mu}^{\mu}| - |h_{Li+\mu}^{\mu}|^2 c_i^2 \quad (12)$$

In Equation 12, $\mu_2$ denotes an optimum offset value estimated by the second offset value estimating apparatus 532. The first offset value estimating apparatus 100 estimates an offset value without considering the channel information. In this case, a process in which the first offset value estimating apparatus 100 estimates the offset value without considering the channel information includes a process of estimating an offset value using probability average values of an amplitude parameter and a phase parameter of the channel information. For example, the first offset value estimating apparatus 100 may estimate the offset value by performing the calculation according to Equation 3 above.

Thus, the offset value estimating apparatus 530 estimates a first offset value $\mu_1$ using the first offset value estimating apparatus 100, estimates a second offset value $\mu_2$ using the second offset value estimating apparatus 532, and estimates a third offset value $\mu_3$ using the third offset value estimating apparatus 534.

In this case, the accuracy of the third offset value $\mu_3$ will be the highest, the accuracy of the first offset value $\mu_1$ will be lowest, and the accuracy of the second offset value $\mu_2$ will between the accuracy of the third offset value $\mu_3$ and the first offset value $\mu_1$.

Thus, depending on a communication environment, the receiving apparatus 500 may select the offset value estimated by any one of the first, second, and third offset value estimating apparatuses 100, 532, and 534.

The channel information storage unit 540 may store channel information that is estimated by the channel information estimating unit 570 in real time, or may store pre-stored channel information.

The channel information that is estimated in real time may be channel information estimated based on a real-time communication environment between the transmitting apparatus and the receiving apparatus 500. The pre-stored channel information may include channel information corresponding to various communication environments.

The pre-stored channel information will be described in greater detail below. The channel information storage unit 540 may store pre-stored channel information corresponding to various channel models that may be selected based on a current communication environment.

For example, a communication environment may include a variance degree of channel information, a changing speed of channel information, the size of a transmitted and received signal, whether line of sight in a propagation path between transmission and reception period exists, but is not limited thereto.

Thus, the pre-stored channel information may include a plurality of channel information sets corresponding to various communication environments. Each of the channel information sets may include an amplitude parameter and a phase parameter of the channel information that depend on the corresponding communication environment.

Thus, the second offset value estimating apparatus 532 and the third offset value estimating apparatus 534 may estimate the offset value using an amplitude parameter and a phase parameter of pre-stored channel information selected based on the current communication environment. In this case, the current communication environment may be determined by the synchronization performing unit 550, or the demodulation unit 560, or both the synchronization performing unit 550 and the demodulation unit 560. However, the current communication environment may also be determined in other ways.

The synchronization performing unit 550 performs synchronization based on the offset value that is estimated by the offset value estimating apparatus 530. That is, the synchronization performing unit 550 predicts a starting position of a preamble symbol based on the estimated offset value. The synchronization performing unit 550 may perform frame synchronization by predicting the starting position of the preamble symbol.

The synchronization performing unit 550 may generate a feedback signal for selecting whether the channel information is to be considered in estimating the offset value based on a result of performing the synchronization. For example, the synchronization performing unit 550 may generate a feedback signal for selecting that the channel information is to be considered in estimating the offset value when errors occur in performing the synchronization, which indicates that the offset value needs to estimated more accurately. Also, the synchronization performing unit 550 may generate a feedback signal for selecting that the channel information is not to be considered in estimating the offset value when errors do not occur in performing the synchronization, which indicates that the offset value does not need to be estimated more accurately.

The demodulation unit 560 demodulates a received signal based on a result of the synchronization performed by the synchronization performing unit 550. Thus, the demodulation unit 560 may obtain data from the received signal received from the transmitting apparatus.

The demodulation unit 560 may generate a feedback signal for selecting whether the channel information is to considered in estimating the offset value based on a result of performing the demodulation. For example, the demodulation unit 560 may generate a feedback signal for selecting that the channel information is to be considered in estimating the offset value in consideration of the channel information when errors occur in performing the demodulation, which indicates that the offset value needs to estimated more accurately. Also, the demodulation unit 560 may generate a feedback signal for selecting that the channel information is not to be considered in estimating the offset value when errors do not occur in performing the demodulation, which indicates that the offset value does not need to be estimated more accurately. In addition, before the receiving apparatus 500 performs initial estimation of the offset value between the transmitting apparatus and the receiving apparatus 500, the synchronization performing unit 550 and the demodulation unit 560 may generate the feedback signal for estimating the offset value without consideration of the channel information.

Furthermore, the synchronization performing unit 550 and the demodulation unit 560 may generate the feedback signal based on a performance required for the receiving apparatus 500 or a network environment.

For example, in an environment requiring optimum performance, the synchronization performing unit 550 and the demodulation unit 560 may generate a feedback signal for selecting that both amplitude information and phase information of the channel information are to be considered in estimating the offset value. In response to this feedback signal, the selecting unit 520 selects the third offset value estimating apparatus 534.

As another example, in an environment requiring moderately good performance, the synchronization performing unit 550 and the demodulation unit 560 may generate a feedback signal for selecting that amplitude information of the channel information is to be considered in estimating the offset value. In response to this feedback signal, the selecting unit 520 selects the second offset value estimating apparatus 532.

As another example, in an environment not requiring good performance, the synchronization performing unit 550 and the demodulation unit 560 may generate a feedback signal for selecting that the channel information is not to be considered in estimating the offset value. In response to this feedback signal, the selecting unit 520 selects the first offset value estimating apparatus 100.

The channel information estimating unit 570 may estimate the channel information in real time based on a result of performing synchronization in the synchronization performing unit 550, or based on a result of performing demodulation in the demodulation unit 560, or based on both a result of performing synchronization in the synchronization performing unit 550 and a result of performing demodulation in the demodulation unit 560. When the receiving apparatus 500 refers to the pre-stored channel information in the channel information storage unit 540, the channel information estimating unit 570 may be disabled, or may be omitted from the receiving apparatus 500.

Thus, the receiving apparatus 500 estimates an optimum offset value for performing frame synchronization, and thus is able perform demodulation of the received signal without any errors.

Figure 6:
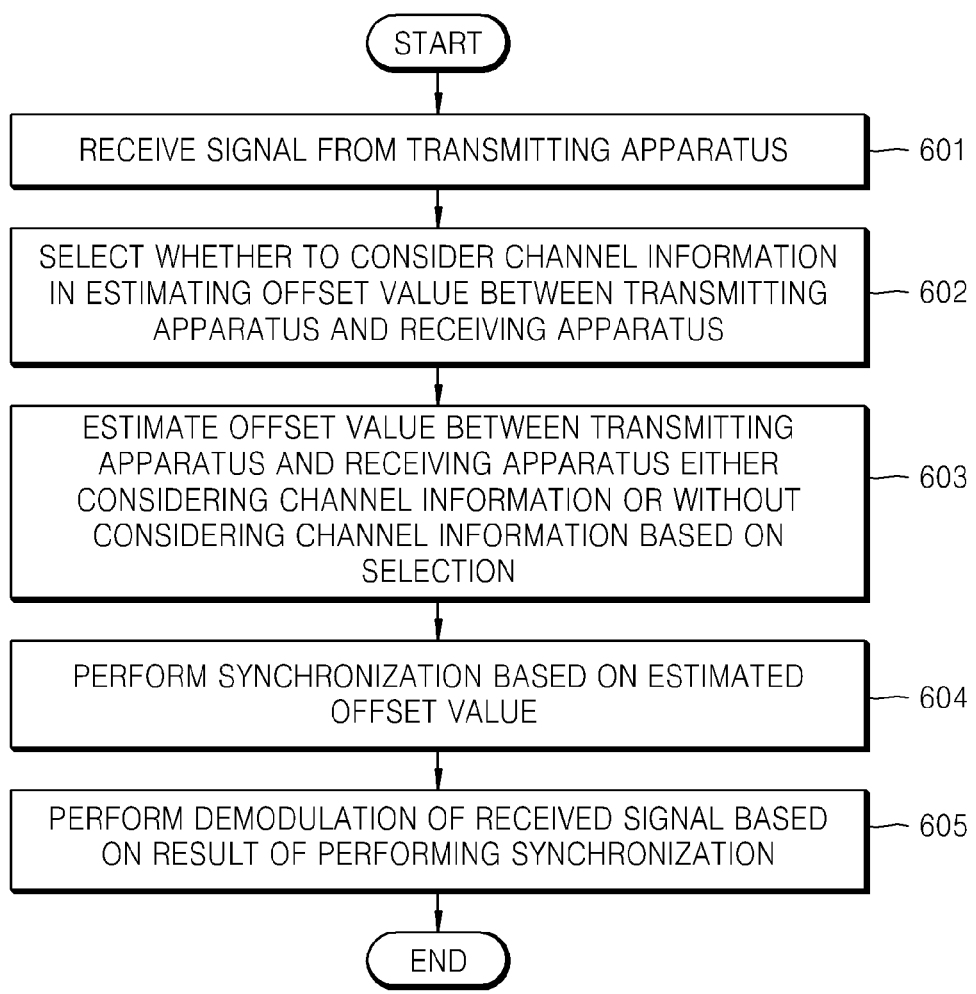
FIG. 6 is a flowchart illustrating an example of a method used in a receiving apparatus to process a signal.

FIG. 6 is a flowchart illustrating an example of a method used in the receiving apparatus 500 to process a signal. Referring to FIG. 6, the method that the receiving apparatus 500 uses to process a signal includes operations that are performed by the first offset value estimating apparatus 100 and the receiving apparatus 500 of FIGS. 1 and 5. Thus, although not repeated below for conciseness, the detailed description of the first offset value estimating apparatus 100 and the receiving apparatus 500 of FIGS. 1 and 5 is also applicable to the method of FIG. 6 used in the receiving apparatus 500 of FIG. 5 to process a signal.

In operation 601, the receiving unit 510 receives a signal from a transmitting apparatus.

In operation 602, the selecting unit 520 selects whether to consider channel information in estimating an offset value between the transmitting apparatus and the receiving apparatus 500.

In operation 603, the offset value estimating apparatus 530 estimates the offset value between the transmitting apparatus and the receiving apparatus 500 either considering the channel information or without considering the channel information based on a selection made in operation 602.

In operation 604, the synchronization performing unit 550 performs synchronization based on the offset value that is estimated in operation 603.

In operation 605, the demodulation unit 560 performs demodulation of the received signal based on a result of performing synchronization in operation 604.

FIG. 7 is a flowchart illustrating an example of a method of estimating an optimum offset value. Referring to FIG. 7, the method of estimating the optimum offset value includes operations that are performed in a time sequence by the first offset value estimating apparatus 100 of FIG. 1. Thus, although not repeated below for conciseness, the detailed description of the first offset value estimating apparatus 100 of FIG. 1 is also applicable to the method of estimating the optimum offset value of FIG. 7.

In operation 701, the sampler 110 samples a signal received by the receiving apparatus in an interval having a predetermined length to generate sampled signals.

In operation 702, the offset value applying unit 120 applies an offset value to the sampled signals generated in operation 701.

In operation 703, the squaring unit 130 squares each of the signals to which the offset value is applied in operation 702.

In operation 704, the multiplying unit 140 multiplies each squared signal that is squared in operation 703 by a corresponding element of a preamble symbol sequence included in each of a plurality of preamble symbols included in a preamble of the signal that is received by the receiving apparatus in operation 701.

In operation 705, the adding unit 150 adds products of the signals multiplied in operation 704 to generate a sum result.

In operation 706, the detecting unit 160 detects, as an optimum offset value, an offset value that generates a greatest sum result of sum results generated by applying the offset value to the sampled signals in operation 702 as the offset value is increased from 0 up to a time corresponding to the predetermined length of the interval in which the received signal was sampled to generate the sampled signals in operation 701.

Thus, according to the examples described above, the optimum offset value may be accurately estimated, and thus frame synchronization may be accurately performed. In addition, a method of estimating an offset value may be adapted to various communication environments by selecting an appropriate method of estimating an offset value depending on a communication environment.

The method and apparatus of estimating an offset value between a transmitting apparatus and a receiving apparatus according to the examples described above make it possible to use duty cycling in performing communication between the transmitting apparatus and the receiving apparatus, enabling the communication to be performed at ultra-low power.

The first offset value estimating apparatus 100, the sampler 110, the offset value applying unit 120, the squaring unit 130, the multiplying unit 140, the adding unit 150, the detecting unit 160, the receiving apparatus 500, the receiving unit 510, the selecting unit 520, the offset value estimating apparatus 530, the second offset value estimating apparatus 532, the third offset value estimating apparatus 534, the channel information storage unit 540, the synchronization performing unit 550, the demodulation unit 560, and the channel information estimating unit 570 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, differential amplifiers, operational amplifiers, low-pass filters, high-pass filters, band-pass filters, analog-to-digital converters, digital-to-analog converters, registers, differentiators, comparators, arithmetic units, functional units, memory devices, radio cards, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A receiving apparatus for receiving a signal from a transmitting apparatus, the receiving apparatus comprising:
    a receiving unit configured to receive the signal from the transmitting apparatus;
    a selecting unit configured to select whether to consider channel information in estimating an offset value between the transmitting apparatus and the receiving apparatus;
    an offset value estimating apparatus configured to estimate the offset value between the transmitting apparatus and the receiving apparatus either considering the channel information or without considering the channel information based on a selection made by the selecting unit;
    a synchronization performing unit configured to perform synchronization based on the estimated offset value; and
    a demodulation unit configured to perform demodulation of the received signal based on a result of performing the synchronization.

2. The receiving apparatus of claim 1, wherein the synchronization performing unit is further configured to generate a feedback signal for selecting whether the channel information is to be considered in estimating the offset value based on the result of performing the synchronization, or the demodulation unit is further configured to generate a feedback signal for selecting whether the channel information is to be considered in estimating the offset value based on a result of performing the demodulation, or the synchronization performing unit is further configured to generate a feedback signal for selecting whether the channel information is to be considered in estimating the offset value based on the result of performing the synchronization and the demodulation unit is further configured to generate a feedback signal for selecting whether the channel information is to be considered in estimating the offset value based on a result of performing the demodulation; and
    the selecting unit is further configured to select whether to consider the channel information in estimating the offset value based on the feedback signal generated by the synchronization performing unit, or the feedback signal generated by the demodulation unit, or based on the feedback signal generated by the synchronization demodulation unit and the feedback signal generated by the demodulation unit.

3. The receiving apparatus of claim 1, wherein the offset value estimating value apparatus comprises a first offset value estimating apparatus configured to estimate the offset value by performing a calculation according to the following equation:

$$\mu_1 = \arg\max_{0 \le \mu \le LT-1} \sum_{i=0}^{T-1} |y_{Li+\mu}^{\mu}|^2 |c_i|$$

where $\mu_1$ denotes an optimum offset value, $y^\mu$ denotes a signal to which the offset value is applied, c denotes a ternary sequence comprising three types of elements, L denotes a length of a predetermined interval at which the elements of the ternary sequence are arranged to form a preamble symbol sequence included in each of a plurality of preamble symbols included in a preamble of the received signal, T denotes a total number of the elements of the ternary sequence, and $\mu$ denotes an offset value applied to the sampled signal to obtain the signal $y^\mu$.

4. The receiving apparatus of claim 1, further comprising:
    a channel information estimating unit configured to estimate the channel information in real time based on either one or both of the result of performing the synchronization and a result of performing the demodulation; and
    a channel information storage unit configured to store the channel information that is estimated in real time and pre-stored channel information.

5. The receiving apparatus of claim 4, wherein the offset value estimating apparatus comprises:
    a second offset estimating apparatus configured to estimate the offset value based on amplitude information of the estimated channel information or the pre-stored channel information; and
    a third offset estimating apparatus configured to estimate the offset value based on amplitude information and phase information of the estimated channel information or the pre-stored channel information.

6. The receiving apparatus of claim 5, wherein the second offset value estimating apparatus is further configured to estimate the offset value by performing a calculation according to the following equation:

$$\mu_2 = \arg\max_{0 \le \mu \le LT-1} \sum_{i=0}^{T-1} 2|y^\mu_{Li+\mu} c_i||h^\mu_{Li+\mu}| - |h^\mu_{Li+\mu}|^2 c_i^2$$

where $\mu_2$ denotes an estimated offset value, $y^\mu$ denotes a signal to which the offset value is applied, c denotes a ternary sequence comprising three types of elements, $h^\mu$ denotes channel information to which the offset value is applied, L denotes a length of a predetermined interval at which the elements of the ternary sequence are arranged to form a preamble symbol sequence included in each of a plurality of preamble symbols included in a preamble of the received signal, T denotes a total number of the elements of the ternary sequence, and $\mu$ denotes an offset value applied to the sampled signal to obtain the signal $y^\mu$.

7. The receiving apparatus of claim 5, wherein the third offset value estimating apparatus is further configured to estimate an offset value by performing a calculation according to the following equation:

$$\mu_3 = \arg\max_{0 \le \mu \le LT-1} \sum_{i=0}^{T-1} 2\,\mathrm{Re}[(y^\mu_{Li+\mu})^* h^\mu_{Li+\mu}] c_i - |h^\mu_{Li+\mu}|^2 c_i^2$$

where $\mu_3$ denotes an estimated offset value, $y^\mu$ denotes a signal to which the offset value is applied, c denotes a ternary sequence comprising three types of elements, $h^\mu$ denotes channel information to which the offset value is applied, L denotes a length of a predetermined interval at which the elements of the ternary sequence are arranged to form a preamble symbol sequence included in each of a plurality of preamble symbols included in a preamble of the received signal, T denotes a total number of the number of the elements of the ternary sequence, and $\mu$ denotes an offset value applied to the sampled signal to obtain the signal $y^\mu$.

8. An apparatus for estimating an optimum offset value with respect to a transmitting apparatus, the apparatus comprising:
a sampler configured to sample a signal received from the transmitting apparatus in an interval having a predetermined length to generate sampled signals;
an offset value applying unit configured to apply an offset value to the sampled signals to obtain signals to which the offset value is applied;
a squaring unit configured to square each signal to which the offset value is applied;
a multiplying unit configured to multiply each squared signal by a corresponding element of a preamble symbol sequence included in each of a plurality of preamble symbols included in a preamble of the received signal;
an adding unit configured to add products of the signals multiplied by the multiplying unit to generate a sum result; and
a detecting unit configured to detect, as the optimum offset value, an offset value that generates a greatest sum result of sum results generated by applying the offset value to the sampled signals as the offset value is increased from 0 up to a time corresponding to the predetermined length of the interval in which the received signal was sampled to generate the sampled signals;
wherein the predetermined length of the interval in which the received signal is sampled to generate the sampled signals is equal to a length of each of the plurality of preamble symbols; and
the preamble symbol sequence included in each of the preamble symbols is a same preamble symbol sequence in each of the preamble symbols.

9. The apparatus of claim 8, wherein the offset value applying unit is further configured to rearrange the sampled signals based on a sampling order of the sampled signals by applying the offset value to the sampled signals.

10. The apparatus of claim 8, wherein the preamble symbol sequence is configured so that three types of elements are arranged at the predetermined interval, and zeros are added between the elements.

11. The apparatus of claim 10, wherein the multiplying unit is further configured to multiply an (Li+$\mu$+1)th signal of the squared signals by an (i+1)th element of the elements of the preamble symbol sequence, where i denotes an integer equal to or greater than 0, L denotes a length of the predetermined interval at which the elements of the preamble symbol sequence are arranged, and $\mu$ denotes the offset value.

12. A method for use in a receiving apparatus to estimate an optimum offset value with respect to a transmitting apparatus, the method comprising:
sampling a signal received by the receiving apparatus in an interval having a predetermined length to generate sampled signals;
applying an offset value to the sampled signals to obtain signals to which the offset value is applied;
squaring each signal to which the offset value is applied;
multiplying each squared signal by a corresponding element of a preamble symbol sequence included in each of a plurality of preamble symbols included in a preamble of the received signal;
adding products of the signals multiplied in the multiplying to generate a sum result; and
detecting, as the optimum offset value, an offset value that generates a greatest sum result of sum results generated by applying the offset value to the sampled signals as the offset value is increased from 0 up to a time corresponding to the predetermined length of the interval in which the received signal was sampled to generate the sampled signals;
wherein the predetermined length of the interval in which the received signal is sampled to generate the sampled signals is equal to a length of each of the plurality of preamble symbols; and
the preamble symbol sequence included in each of the preamble symbols is a same preamble symbol sequence in each of the preamble symbols.

13. The method of claim 12, wherein the applying of the offset value comprises rearranging the sampled signals based on a sampling order of the sampled signals by applying the offset value to the sampled signals.

14. The method of claim 12, wherein the preamble symbol sequence is configured so that three types of elements are arranged at the predetermined interval, and zeros are added between the elements.

15. The method of claim 14, wherein the multiplying comprises multiplying an (Li+$\mu$+1)th signal of the squared signals by an (i+1)th element of the elements of the preamble symbol sequence, where i denotes an integer equal to or greater than 0, L denotes a length of the predetermined interval at which the elements of the preamble symbol sequence are arranged, and μ denotes the offset value.

16. A non-transitory computer-readable storage medium storing a program for controlling a computer to perform the method of claim 12.

17. A method for use in a receiving apparatus to process a signal, the method comprising:
- receiving a signal from the transmitting apparatus;
- selecting whether to consider channel information in estimating an offset value between the transmitting apparatus and the receiving apparatus;
- estimating the offset value between the transmitting apparatus and the receiving apparatus either considering the channel information or without considering the channel information based on a selection made in the selecting;
- performing synchronization based on the estimated offset value; and
- performing demodulation of the received signal based on a result of performing the synchronization.

18. The method of claim 17, further comprising generating a feedback signal for selecting whether the channel information is to be considered in estimating the offset value based on the result of performing the synchronization or generating a feedback signal for selecting whether the channel information is to be considered in estimating the offset value based on a result of performing the demodulation, or generating a feedback signal for selecting whether the channel information is to be considered in estimating the offset value based on the result of performing the synchronization and generating a feedback signal for selecting whether the channel information is to be considered in estimating the offset value based on a result of performing the demodulation;
- wherein the selecting comprises selecting whether to consider the channel information in estimating the offset value based on the feedback signal generated based on the result of performing the synchronization, or based on the feedback signal generated based on a result of performing the demodulation, or based on the feedback signal generated based on the result of performing the synchronization and the feedback signal generated based on a result of performing the demodulation.

19. The method of claim 17, further comprising estimating the channel information in real time based on either one or both of the result of performing the synchronization and a result of performing the demodulation;
- wherein the estimating of the offset value comprises estimating the offset value considering the estimated channel information.

20. The method of claim 19, wherein the estimating of the offset value considering the channel information comprises estimating the offset value considering either amplitude information of the estimated channel information or amplitude information and phase information of the estimated channel information.

* * * * *